F. L. SAWYER.
FOG NAVIGATION.
APPLICATION FILED MAR. 7, 1914.
1,151,293.
Patented Aug. 24, 1915.
3 SHEETS—SHEET 1.
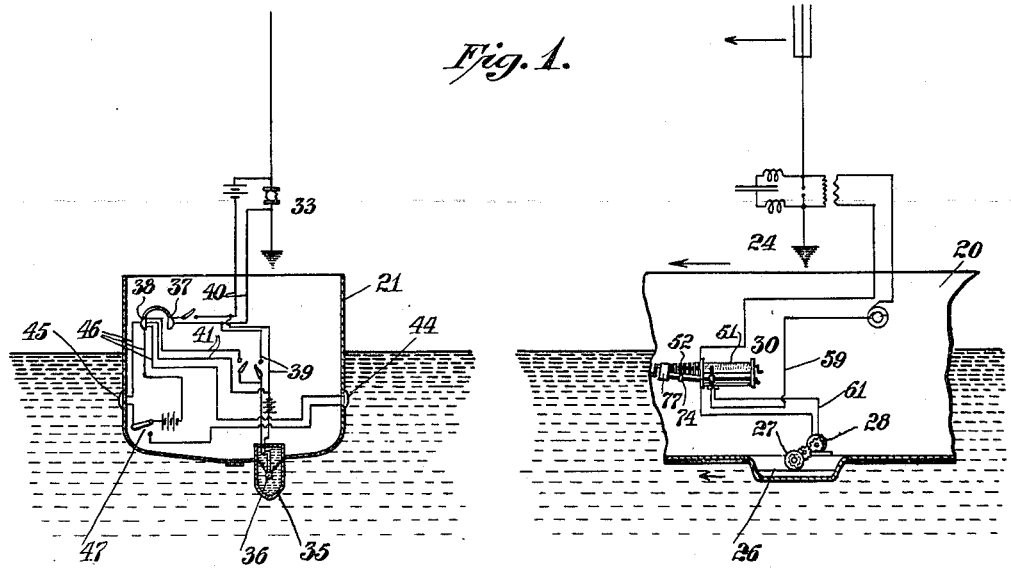
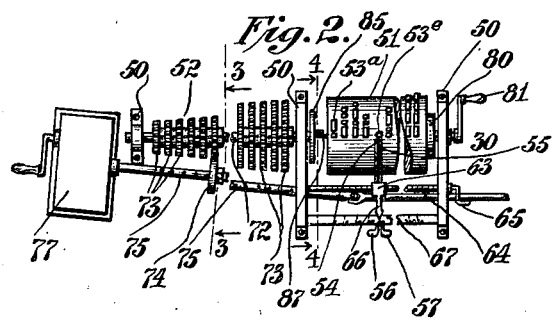
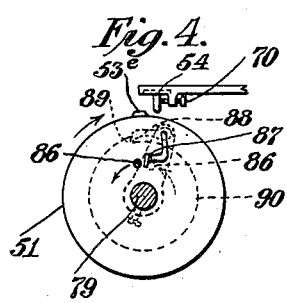
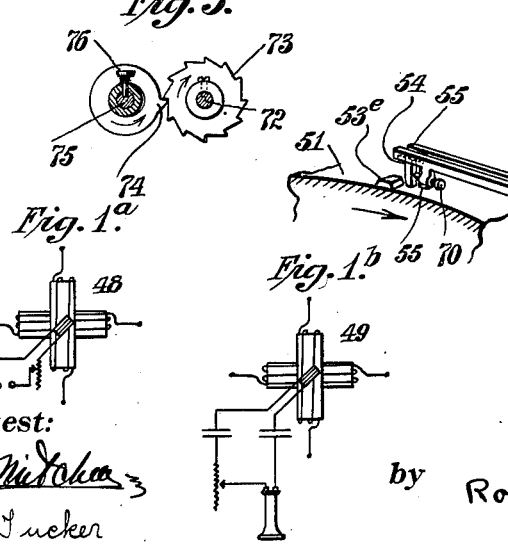
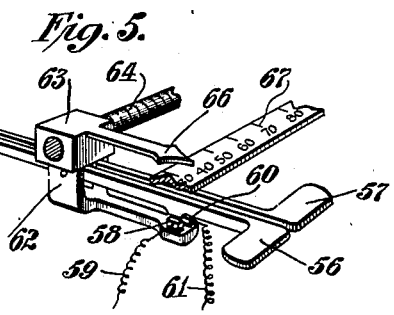
Attest:
Inventor:
Frederick L. Sawyer,
by Rogers, Kennedy & Campbell,
his Attys.

F. L. SAWYER.
FOG NAVIGATION.
APPLICATION FILED MAR. 7, 1914.
1,151,293.
Patented Aug. 24, 1915.
3 SHEETS—SHEET 2.
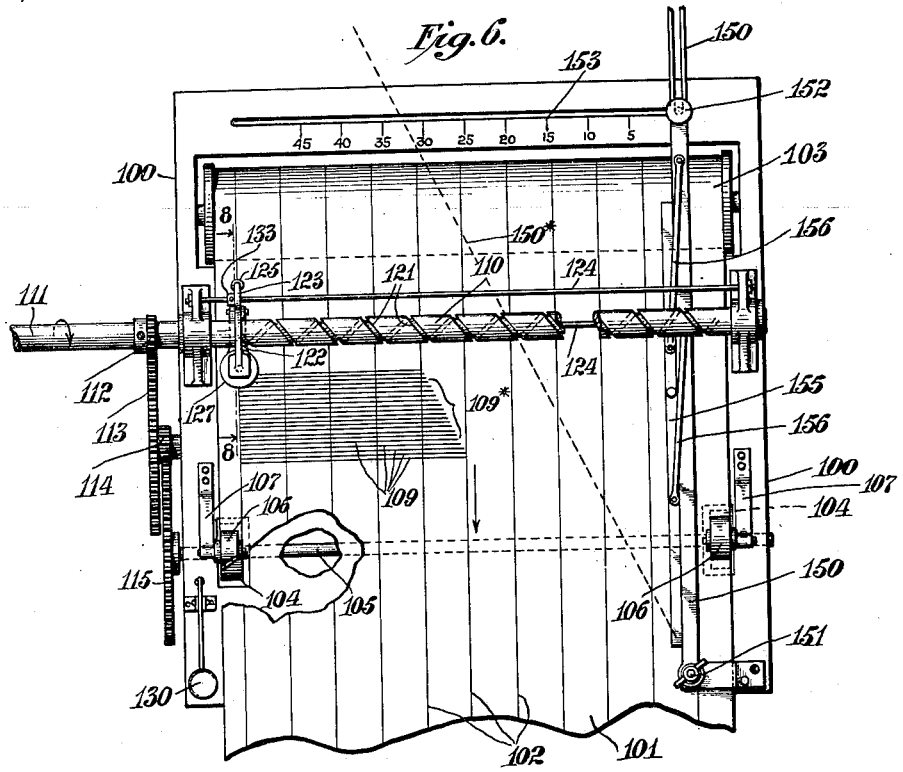
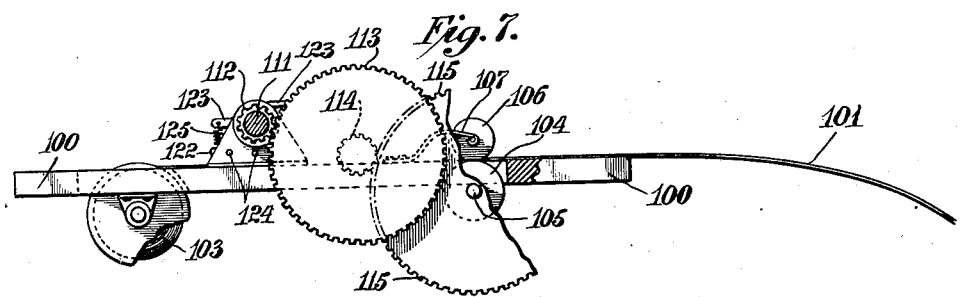
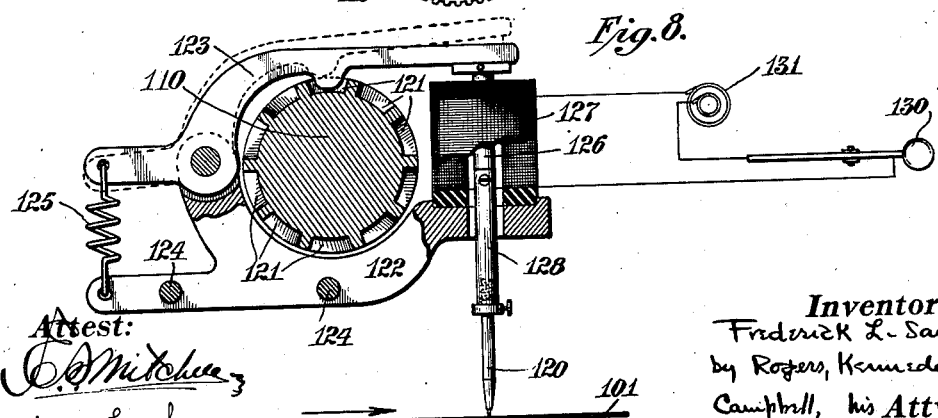
Inventor:
Frederick L. Sawyer,
by Rogers, Kennedy &
Campbell, his Attys.

F. L. SAWYER.
FOG NAVIGATION.
APPLICATION FILED MAR. 7, 1914.
1,151,293.
Patented Aug. 24, 1915.
3 SHEETS—SHEET 3.
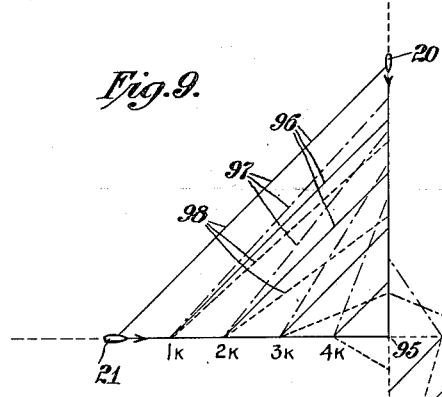
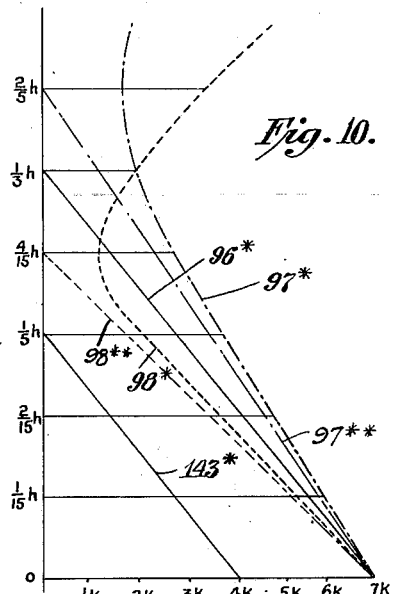
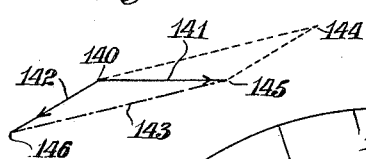
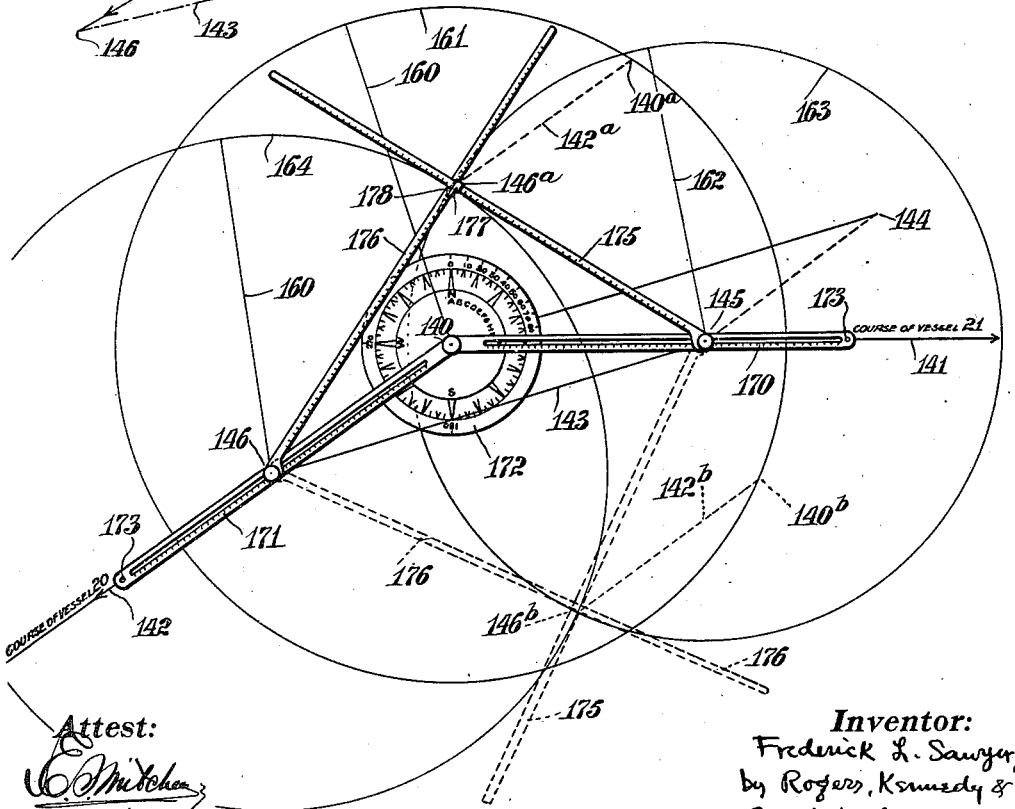
Inventor:
Frederick L. Sawyer,
by Rogers, Kennedy &
Campbell, his Attys.
Attest:

UNITED STATES PATENT OFFICE.

FREDERICK LEWIS SAWYER, OF NEW YORK, N. Y.

FOG NAVIGATION.

1,151,293.  Specification of Letters Patent.  Patented Aug. 24, 1915.

Application filed March 7, 1914. Serial No. 823,081.

*To all whom it may concern:*

Be it known that I, FREDERICK LEWIS SAWYER, a citizen of the United States, residing at New York city, in the county of New York and State of New York, have invented certain new and useful Improvements in Fog Navigation, of which the following is a specification, reference being had therein to the accompanying drawing.

This invention relates to fog navigation, that is to say, safe navigation at sea in fogs, heavy rains, snow, etc., and more especially to improving the art of navigation; to prevent accidents to nautical vessels by determination of probability of collision, and by determination of relative positions, the invention being available for example, in the case of two ships both in motion. By the invention, two or more vessels, unseen to each other, are enabled to determine their respective courses, speeds, distances and relative bearing and position, so that without need of changing course or speed all information is secured needed to avoid danger of collision. Present methods are objectionable in relying upon fog whistles, and the international rules of the road require all vessels to slow down in a fog.

The basis upon which the novel principles of the present invention rest is a combination of different impulses, preferably Hertzian waves transmitted in air, and sound vibrations transmitted beneath water, for communication between the two ships or stations, although no claim is herein made to the origin of the mere idea of the utilization of these combined modes of energy propagation since the same has already been suggested, for example, in the British patent of Kelway 12,124 of 1899.

The main object of the present invention is to afford in the art of navigation in fogs more accurate and more prompt and complete informative results than heretofore available.

Other and more specific objects will be elucidated in the hereinafter following description of one illustrative mode in which the present invention may be carried out.

To the attainment of the objects and advantages herein referred to the present invention consists in the novel art, methods and steps herein illustrated or described.

Since certain features hereof may be better expounded by the aid of diagrams and other illustrations, drawings are appended as a part hereof, in which—

Figure 1 is a diagrammatic representation of two floating vessls containing respectively the sending and receiving means arranged in accordance with and for carrying out the principles of this invention. Figs. 1ª and 1ᵇ respectively show modifications in the Hertzian sending and receiving apparatus for finding direction. Fig. 2 is a top plan view of a mechanism for controlling the sending of Hertzian and sound waves in accordance herewith. Fig. 3 is a cross section of the plane 3—3 of Fig. 2. Fig. 4 is a similar section on the plane 4—4 of Fig. 2. Fig. 5 is a partial perspective showing details of the devices for adjustment of the signal controlling apparatus. Fig. 6 is a plan view of an apparatus at the receiving end of the system for registering the elapsed time and plotting a diagram of the distance variations. Fig. 7 is a left elevation of the apparatus shown in Fig. 6. Fig. 8 is a vertical section on the plane 8—8 of Fig. 6. Fig. 9 is a diagram of a supposed case of approaching ships illustrating the distance changes between the ships for three supposed instances of speed of the sending ship. Fig. 10 is a diagram plotted from the readings of Fig. 9 showing the nature of the distance variations when there is or is not probability of collision. Fig. 11 is a supplemental diagram for determining the rate of approach of two vessels. Fig. 12 shows a vessel locating diagram, and also a plotting instrument, the latter forming both an adjunct for determining danger of collision in accordance with the apparatus of Fig. 6 and a means for determining location by successive observations.

As will be hereinafter described more in detail, the illustrated embodiment of the present invention includes the following cooperative features. Upon what may be termed the sending vessel is a novel sending mechanism for synchronously producing the Hertzian and sound impulses to be transmitted through air and water respectively to what may be termed the receiving vessel. Second, a novel receiving means therefor. Third, a method of reckoning by means of successive distance observations in order to determine the probability of collision.

Fourth, a more expeditious method of determining probability of collision by a comparison of the rate of approach of the vessels as observed by the combined Hertzian and sound impulse apparatus, with an assumed rate of approach leading to collision and determined from communicated intelligence as to the speed and course of the sending vessel. Fifth, a method of determining relative location, including bearing and distance, of the sending vessel by combining the information acquired in the modes before referred to. Sixth, a distance plotting apparatus whereby the successive distance readings are promptly and effectively reduced to the graphic form of a diagram or plotting so as to render practically instantaneous the matter of reckoning for the purposes of this invention. Seventh, a position plotting instrument capable of utilizing the communicated signals for the determination of the rate of approach thereof, and for the determination of the approximate position of the sending vessel.

For convenience of illustration one ship 20 is shown as having the sending apparatus, the second ship 21 having the receiving apparatus, although naturally, in practice, each ship would have both apparatuses. The two ships may be assumed to be a few miles apart in open water, both of them under way and having such relative directions that their courses will cross.

The sending ship 20 may have any ordinary so-called wireless sending apparatus conventionally indicated at 24. Also a submarine sound sending apparatus capable of sending over a range of several miles in all directions, conventionally illustrated as comprising a stretched strip 26 excited into longitudinal vibrations by a rotating wheel 27 as in Patent 1,036,265 of August 20, 1912, this device shown intermittently operable by magnetically controlled mechanism 28 on the plan disclosed in pending application No. 749,255, filed November 21, 1912. A controlling mechanism 30 serves to simultaneously effect the operation of the sound producing and wireless apparatus respectively, which preferably send their signal impulses synchronously.

For descriptive purposes the Hertzian waves may be considered to travel instantaneously from ship to ship and the submarine sound impulses 4794 feet or approximately three-fourths of a knot per second. Thus the receiving ship 21 will receive the two impulses at an interval which varies according to the distance between the ships.

The receiving ship may have any desired wireless receiving apparatus, conventionally indicated at 33, and any submarine sound receiving apparatus, conventionally illustrated as of the type of my prior application, Serial No. 814,864, filed January 28, 1914, wherein a housing 35 stands below the ship bottom to receive from all directions and contains a sound transmitting material in which is located a microphone 36. Diagrammatically the illustration shows a receiving head-gear, having a right ear piece or receiver 37 and a left ear piece 38. The sound receiving microphone 36 is shown connectible by wires 39 to the right ear piece, and the Hertzian receiving apparatus by wires 40 to the same ear piece, although, if desired, the sound receiving instrument can be switched, so that the sound signals will be received by wires 41 at the left ear piece. This apparatus affords the means of determining the elapsed time between the receipt of the different types of impulses, and thereby the distance between the vessels.

It is frequently desirable to form a general determination as to the direction of the sending ship. One simple means for this purpose is shown in the form of a pair of restricted-arc sound detecting devices or microphones 44 and 45 located at the opposite sides of the ship and connected by circuits 46 with the left ear piece 38. A control switch 47 can be thrown between two positions for connecting either receiver, 44 or 45, to the ear piece so that by trying them both the operator is able to judge by the received sounds on which side the sending ship lies. When the left ear piece is used for this purpose, the Hertzian receiving apparatus and the main sound receiving apparatus will preferably be both connected, as shown, to the right ear piece, and in that case, when the right ear piece is in use, the left may be thrown out by setting a switch 47 at a neutral point. The circuits are shown with the microphones 36 and 44 and the wireless receiver 33 thrown out, and only the microphone 45 thrown in. There may additionally be employed a wireless direction finding means such as indicated by the special sending apparatus 48, Fig. 1ª, and receiving apparatus 49, Fig. 2ᵇ.

Figs. 2 to 5 indicate the principles of the signal sending mechanism 30 which is preferred to be employed. This is capable of causing simultaneous Hertzian and sonorous signals. It is also preferably motor driven so as to automatically repeat the sent signal, and is adjustable so that the repeated signal occurs at variable intervals, the interval indicating some factor desired to be known, for example, the speed of the sending ship, a fifteen knot speed being indicated by the sending of the signal at fifteen second intervals. The machine is also adapted to send any one of a number of predetermined code symbols, for example, the thirty-six international code characters, A, B, C *** Y, Z; 1, 2 *** 8, 9, 0; indicating the course of the ship. Thus, the symbol A sent repeatedly at twelve-second intervals would indicate the sending ship was traveling due north at a speed of twelve knots per hour. Symbol B would indicate a course N. 10° E. On a vessel supplied with this apparatus the operator has simply to place the same in operation upon entering a fog, and any receiving ship within range will be enabled to ascertain the course and speed of the sending ship and, as before explained, the distance between the ships. The employment of these factors, according to this invention, will be hereinafter explained.

The controller 30 for sending the synchronized signals may comprise frame parts 50 supporting a signal sending drum or device 51 and an interval controlling drum or device 52. The signaling drum 51 may be of sufficient length to contain the thirty-six characters mentioned. The characters may be formed by configuration of the moving surface of the drum, for example, the dot and dash elevations 53ª representing the letter A, and this may serve to actuate a follower or a pair of contacts or followers, 54, 55, which, in turn, cause the closing of circuits respectively for sending sonorous and Hertzian impulses. In Figs. 2 and 5 the followers are shown adjusted opposite the character 53ᵉ representing the letter E, consisting of a single dot. This represents N. 40° E. This, with a cam-like action, lifts both the followers 54, 55. The follower 54 is shown as forming part of a key 56 and likewise the follower 55 a key 57, which keys are depressible either by hand, for sending signals manually or, on the other hand, they are depressible automatically by the lifting of the followers as described. The key 56 when depressed makes contact with a contact 58 connected by circuit 59 with the wireless sending system. The key 57 analogously makes contact with the contact 60 connected by circuit 61 with the mechanism 28 controlling the sonorous sending apparatus.

The followers and keys 54—57 may be longitudinally adjustable to bring the followers opposite any desired character, and for this purpose they may be mounted upon a carrier 62 comprising a threaded block 63 engaging a threaded rod 64, rotatable by crank handle 65 to shift the carrier as desired, it having a pointer 66 opposite a fixed scale 67 to facilitate the desired adjustment of the followers. The pointer is opposite the number 40 on the scale indicating that the symbol E will be transmitted which corresponds with the course of N. 40° E.

As already stated, it is desired that the Hertzian and sonorous impulses be sent simultaneously from the sending ship. In order to permit their being adjusted into exact synchronism, a synchronizing device may be employed. For example, the follower 54 has its depending finger longitudinally shiftable and adjustable along the follower by a screw device 70. To effect such synchronization the operator has simply to operate the sending apparatus while listening to his own signals. If the Hertzian and the sonorous signals reach his right and left ear simultaneously the parts are in proper adjustment; otherwise the screw 70 will be turned to relatively advance or retard the action of the wireless sending key 56.

The drum or device 52, for determining at what intervals the signals will be sent, may consist of a shaft 72 carrying a graduated series of ratchet wheels or the like 73. These are shown in successively increasing sizes. A rotating pawl device 74 may be employed to coöperate with the ratchet wheels to cause the revolution of the shaft. There may be as many ratchet wheels as desired, graduated as desired. For example, the sixth ratchet wheel 73 is seen in Fig. 3 to have twelve teeth so that by rotating the pawl 74 once per second the shaft 72 will rotate once in twelve seconds, which will be the case if the vessel is traveling twelve knots per hour. The pawl device 74 may be carried on and rotated by an constantly rotating shaft 75 and may be adjustable at will along that shaft by a spring device 76 coöperating with holes in the shaft so that the operator may set the pawl opposite any desired ratchet to cause the signals to be repeated at the desired intervals. For rotating the pawl shaft 75 any motor 77, such as a clock work, may be employed, properly governed, to give the necessary steady revolving motion to the shaft.

To directly connect the ratchet shaft 72 with the shaft of the signal sending drum 51 would give the proper intervals, but in order that the dots and dashes constituting each character may be sent in a regular manner it is preferred that the drum 51 be rotated, not by but under the control of the ratchet shaft. For example, the drum may be rotated by a coil spring contained in barrel 80 wound by handle 81 and any convenient governor or escapement device may be included to give the desired regular and slow drum rotation, say one rotation in four seconds.

In order that the ratchet shaft 72 may control the rotation of drum 51 the shaft is provided with a disk 85 having a projecting pin 86 coöperating with a control dog 87 which controls the position of a pawl 88 pivoted on a fixed support secured on the stationary axle 79 within the drum. The pawl normally engages the shoulder 89 formed at the periphery of a collar or disk 90 rotating with drum 51. Referring to Fig. 4, it will be understood that the pin 86 will advance leftwise, as indicated by the small arrow, in a step by step fashion until, after a complete turn of the ratchet shaft, the pin passes from the dotted to the full line position, Fig. 4. It throws the dog 87, lifting the pawl 88, and thereby permitting the drum 85 to rotate clockwise a complete turn, the parts coming again to rest in the normal position illustrated.

By the described mechanism as adjusted, the ratchet shaft is caused to make a complete rotation in twelve seconds, whereupon it releases the signaling drum which latter makes a regulated quick rotation, sending the desired code signal and then remaining at rest until the end of another twelve-second interval.

The apparatus shown in Figs. 6, 7 and 8 can be best explained by first explaining the diagrams Figs. 9 and 10.

Referring first to Fig. 9, 21 is supposed to be the receiving ship at which the observer is stationed and 20 the sending ship. Let it be assumed that their courses are directed to cross as shown. Let us also first suppose that the relative speeds are such that the vessels will collide at the intersecting point 95. For example, suppose it is five knots from 21 to 95, and five knots from 20 to 95, and suppose vessel 21 is traveling fifteen knots per hour and vessel 20 fifteen knots per hour. This will produce collision at 95. The direction of the line from point 21 to point 20 is known as the bearing of the latter vessel. Under the conditions stated this bearing is preserved as the ships approach the point 95 and this fact is indicated by the parallelism of the successive bearings shown by full lines 96, 96, etc. If the ship 20 is traveling only nine knots per hour she will reach the point 95 behind the ship 21, and there will be no collision. Under these circumstances the ship 20 is said to be hauling aft instead of preserving her bearing, the bearing changing from period to period as indicated by the long dash lines 97. If, on the other hand, the ship 20 is traveling twenty-one knots per hour, she will be hauling ahead and her successive bearings will be as indicated by the short dotted lines 98, showing that the ship 20 will have passed two knots beyond the intersecting point 95 when the ship 21 reaches there. Now on the diagram Fig. 9, the different lines 96, 97, 98 indicate not only the relative bearings of the ships, but also the successive distances between them and I have found that when the vessels have the course and speed to collide, the distance between the vessels varies uniformly for uniform time intervals. This is demonstrable on Fig. 9 where the lines 96, drawn parallel to each other and equally spaced, will, of necessity, decrease uniformly down to the point of collision 95. This statement may be transposed into the form of the diagram shown in Fig. 10 in which distances along the vertical base line represent the advancing time, and horizontal ordinates the distances between the vessels. Transposing the lines 96 gives the plotting 96*, and as the rate of distance decrease is uniform that plotting will be a straight line intersecting the vertical base line one-third hour from the axis.

It follows that by plotting such a diagram as Fig. 10 it can be determined, according to whether a straight or curved line results, if the ships are likely to collide. The more nearly the plotting approximates a straight line, the greater is the probability of collision. To demonstrate the correctness of this let us take the case of the bearing lines 97 where the ship 20 is hauling aft. The successive distance lines 97 transferred to the diagram 10 will be seen to give a curved plotting 97* the curved character of which indicates lack of probability of collision. Similarly taking the distance lines 98 gives the curved plotting 98*. The observer will thus determine whether or not the sending vessel is preserving her bearing, or on the other hand is ahead or hauling aft.

The observer on the receiving ship, knowing nothing of the sending ship save the successive distance observations, may lay out such observations in a diagram like Fig. 10, gradually constructing a plotting of the distance variations or rate of approach and, by observing that more carefully as the distance between the vessels decreases, he is able to observe, while the ships are yet a far distance apart, whether the plotting is to be a straight line as 96*, or a curve such as 97* or 98*, and if the latter, will know that the ships, preserving their speed and course, cannot collide.

To avoid loss of time in making the plotting of Fig. 10, I have devised the apparatus or instrument of Figs. 6, 7 and 8, by which the distance ordinates are laid out according to the successive observations, giving a series of points constituting a plotting representing the decrease of distance between the vessels. Of course, if the vessels are running parallel at the same speed the distance plotting will give a line parallel to the vertical base of the diagram. If the vessels are separating rather than approaching, the plotting will be inclined in the reverse direction. Therefore, the receiving vessel need only be concerned with the danger of collision when the plotting is inclined as in Fig. 10, and continued observations will indicate in ample time how proximate the danger is.

The apparatus of Figs. 6 to 8 include a base or frame 100. The paper ribbon 101 travels in the direction of the arrow, say at the rate of sixty inches per hour, and the line near its left margin is the base line corresponding to the vertical base in Fig. 10. The paper is ruled lengthwise by lines 102, say one inch apart, each inch representing a knot measured transversely with one-tenth knot subdivision and corresponding with horizontal distances in Fig. 10. The paper may be drawn from a supply roll 103 and may be fed uniformly by a pair of under feed rolls 104 on feed shaft 105, these rolls being opposed by upper rolls 106 pressed downward by springs 107 to afford proper driving friction.

To construct the successive distance ordinates 109 a device 110 may be employed. This is shown in the form of a helically grooved shaft capable of causing the advance of a stylus transversely to the paper. It is desired that the shaft 110 shall rotate constantly and uniformly and at such speed as to feed the stylus to give ordinates corresponding to the distance between the ships. As will be explained, the stylus is to be set in action on the receipt of the Hertzian impulses and thrown out of action on the receipt of a submarine sound impulse. Assuming the elapsed time to represent for each second three-fourths of a knot distance between vessels, the shaft 110 will be so timed as to advance the stylus one knot, that is, one inch per 1.3 second.

To insure that the ordinate constructing shaft 110 and the paper feeding shaft 105 will operate in unison, they may be both driven from the same clock work or uniform speed motor represented in Fig. 6 by the drive shaft 111. For example, shaft 110 may be directly connected in alinement with the drive shaft, and supported by suitable bearings at its ends at opposite sides of the base 100. The paper feeding shaft, which is more slowly moving, is shown connected by pinion 112, gear 113 engaging it, pinion 114 on the gear shaft and gear 115 on the feed shaft.

The stylus 120 and the means for connecting and disconnecting it are shown in plan view in Fig. 6 and in left hand elevation on an enlarged scale in Fig. 8. In order that the shaft 110 may feed the stylus carrier transversely or rightward across the paper, the shaft is helically grooved at 121. For convenience, a single such groove is shown in Fig. 6 but to facilitate the more prompt engagement of stylus carrier with the feeding shaft, any desired number of grooves might be employed, for example, ten, shown in Fig. 8. Supported on the body of the stylus carrier 122 is a single follower device 123, although, as with the grooves, this might be multiplied to give quicker engagement. The carrier body is shown as disposed beneath the shaft and adapted to slide transversely of the paper guided by a pair of guide rods 124. The follower 123 is shown as overhanging the grooved shaft 110, it being in the form of a pivoted lever having a light spring 125 tending to lift the follower to remove its depending finger from engagement with the shaft groove. The dotted lines (Fig. 8) show inoperative position and the follower is adapted to be depressed to the full line operative position by the means about to be described.

Depending from the follower 123 is a magnetic armature or, rather, solenoid core 126 surrounded by a solenoid coil 127, the two so relatively arranged that on exciting the coil the core will be pulled downwardly depressing the follower into operative position.

Instead of having a stylus or pencil 120 constantly in contact with the paper, and instead of having it depressed only at the end of its advancing travel, I prefer to have it brought into contact with the paper during its advance so as to actually scribe the ordinate and to be thereafter retracted from the paper. This is conveniently accomplished by the same solenoid by simply attaching stylus holder 128 to the solenoid core 126. The stylus 120 itself may be adjustably attached to its holder 127.

The described mechanism is efficiently controlled by a simple electrical key 130. The depression of the key closes the circuit between a source 131 of alternating current and the solenoid core. Releasing the key breaks the circuit. The operator with the ear piece 37 connected as in Fig. 1 receives first a Hertzian and then a sonorous signal. On receiving the Hertzian signal he depresses the key 130 and on receiving the submarine sound signal releases it. At once the key is depressed, the circuit is closed, the follower is moved into operative position, and the carrier 122, acted upon by the helical groove in the shaft 110, commences to travel rightward at a speed representing three-fourths knot per second. The depression of the solenoid core brings the stylus 120 into contact with the paper, and a transverse line is drawn at the rate stated. This action continues until upon receipt of the sound signal the operator releases the key when the follower disengages the groove, the carrier comes to rest and the stylus lifts from the paper. The length of the ordinate so drawn represents the distance between the ships. The carrier, being disengaged from the shaft, may be easily slid back by hand to initial position, a stop 133 insuring accurate positioning of the stylus upon the base line, although any simple resilient or other return mechanism might be employed for restoring the parts.

In the manner described the successive series of ordinates or distance lines 109 are constructed, as shown in Fig. 6, and the extremities of these ordinates or a mean line drawn near their extremities, if they are not regular, will constitute the plotting 109* corresponding to the plottings shown in the diagram Fig. 10.

Interpreting the actual plotting shown at Fig. 6, it indicates that at the first recorded observation the vessels were five knots apart, that they are now four knots apart, and that they are approaching each other at a rate which is apparently uniform because the plotting 109* is apparently a straight line. The rate of approach is substantially one knot per one-thirtieth of an hour. Under these circumstances the observation should be carefully continued as the ships approach so as to determine as quickly as possible whether the plotting is actually a straight line, such as 96*, Fig. 10, which would indicate probable collision, or is a curved line as 97*, or 98*, which would indicate that the vessels would be at a safely removed distance in passing the intersecting point of their courses.

It will be understood that all of this described reckoning may be done without knowledge of the relative location of the sending vessel or its course or speed.

The desired results are facilitated and the reckonings checked up by the following process of reckoning, which also affords much more prompt determination of the likelihood of collision assuming the two vessels to maintain their course and speed, which is the usual condition. This process is partly illustrated in Fig. 11 and is practically applied in Figs. 10 and 6. In Fig. 11, starting at the point 140, the line 141 is laid out indicating the direction and speed of the observer's vessel and the line 142 those of the sending vessel. Completing the triangle gives the hypotenuse 143 which is the resultant in direction and speed of the motions of the two vessels. The length of the line 143, therefore, assuming the vessels are approaching, represents their relative rate of approach. Now, it is evident that the relative approach of the vessels must be in the direction and speed represented by 143 if they are to collide, and this is demonstrated by completing the parallelogram of motions giving the imaginary point 144 at which the sending ship must be located in order to collide at 145 with the receiving ship, when both vessels preserve their course and speed. Taking an example, if the arrow 141 represents a speed of the receiving ship of twelve knots per hour and the line 142 a sending ship speed of eight knots per hour, the resultant or line 143 indicates approximately eighteen knots per hour as the rate of relative approach when collision is probable.

A diagram like Fig. 11 made on the different conditions of Figs. 9 and 10 would give for speeds of fifteen and fifteen knots per hour a rate of approach of twenty-one knots per hour, or say four knots per one-fifth hour. This affords the danger approach line 143* Fig. 10. By now comparing the plotting 96* with the danger rate 143* it will be seen that the plotting 96* is parallel to the danger line and that, therefore, if the rate of approach of the vessels is such as to give the plotting 96* there is danger of collision. In other words, when the actual plotted rate of approach is equivalent to the theoretically ascertained rate of approach which indicates collision it follows that the vessels are approaching at uniform rate from which, in turn, it follows that the vessels are preserving their relative bearings, from which, again, in turn, it follows that collision is probably. Therefore, with this supplemental method the observer while a number of miles from the sending ship may approximately determine the probability of collision without awaiting the necessity of following out the plotting to determine its straightness or curvature. Thus, at Fig. 10 the first observation and that taken one-fifteenth or two-fifteenths hour later give the relative rate of approach of the vessels enabling a determination of the correspondence or parallelism with the danger line 143*. The plottings 97* and 98* may be compared with similarly ascertained danger lines 97 and 98, and being out of parallelism indicate that there is no danger of collision if the vessels do not change their course and speed.

The described supplemental reckoning may be performed directly on the Fig. 6 apparatus by the aid of the Fig. 11 diagram in the following novel and convenient manner: A swinging arm 150 which might be pivoted to the far left hand corner is, however, preferably pivoted to 151 at the near right hand corner of the diagram, while the free end of the arm is capable of adjustment by a clamping device 152 along a transverse scale 153. The pivot 151 is a given distance from the scale 153, for example, twelve inches representing one-fifth hour. If, now, the free end of the arm 150 be swung to the left to a position on the scale 153 reading from right to left representing the rate of approach of the vessels per one-fifth hour as indicated by the line 143 of such diagram as Fig. 11 the arm will take a position of incline corresponding to the dangerous rate of approach and corresponding to the line 143* of Fig. 10. In the case of Fig. 6, the rate of approach having been determined at 32 knots per hour, the arm 150 is swung to the dotted position 150* intersecting the scale 153 at a point about six inches to the left, or at 32 on the scale. Clamping the arm 150 at that point the apparatus is immediately in condition for comparison between the plotting 109 and the danger line 150*. If they are parallel or nearly parallel, collision is probable. If they are far from parallel, that fact indicates no danger of collision. To assist a quick determination of parallelism the arm 150 is provided with a parallel ruler device consisting of the movable rule 155 connected to arm 150 by links 156.

Reviewing now the operation of this part of the invention, the operator, upon first receiving the character or code signal representing the direction of the sending ship and noting the interval of sending, is enabled to lay out such lines as 141, 142, Fig. 11, and measure the hypotenuse 143 giving the rate of approach of the vessels, which, laid out on scale 153, Fig. 6, determines the position of the arm 150, which is clamped there for subsequent use. Afterward, when the sound signals begin to come in and the ordinates 109 are constructed, the operator is soon able to determine generally the direction of the plotting 109*, which he may, as soon as desired, compare with the danger line 150* by the parallel ruler 155. In fact, it will be convenient after constructing the first ordinate 109 to set the arm 150, shift the parallel ruler 155 to coincide with the ordinate extremity, and actually draw the danger line through the extremity of the first ordinate, after which the ruler and arm can be adjusted out of the way, the danger line affording a constant basis of comparison for determining the liability of collision.

It will be understood that in practice the proportions or dimensions of the described apparatus may be altered or enlarged to suit the convenience of the conditions, but the illustrative example shown and described sufficiently indicates the principles of the improvement.

Having the course and speed of both ships and successive distance readings, as above outlined, which latter are permanently recorded on the Fig. 6 diagram, it is herein proposed to ascertain, when desired, the relative location of the unseen sending ship, and the diagram portion of Fig. 12 indicates the proposed method hereof. A convenient point 140 on the paper being selected as the point of the first observation, the base line 141 for the diagram will be drawn representing the course of the receiving vessel. By a protractor the course 142 of the sending vessel will be laid out. We will suppose two observations are taken at five-minute intervals and that the sending ship, during that five minutes, travels from the point 140 to 145 on the diagram. If the sending ship be imagined as starting from the same point 140, we can lay out according to its speed the point 146, representing a theoretical position of the sending ship. Incidentally, connecting 145 and 146 gives the same hypotenuse 143 as indicated in Fig. 11, so that the diagram of Fig. 12, and the instrument working on the principles thereof, may be employed in lieu of Fig. 11.

Suppose the observations taken at the point 140 indicate that the unseen sending ship is at a distance represented by the radius 160. We may draw the circle 161 on whose circumference the ship lies. If five minutes later distance of the sending ship is that of the radius 162, we may draw the circle 163 with 145 as a center and may know that the ship is at that time on that circle. The problem is now to find the position of a line having the length and direction of the line 140—146 touching the circle 161 at its first end, and that the circle 163 at its terminus. It will be found that there are two solutions, namely, either the line 142$^a$ or the line 142$^b$, the first indicating that the ship was at the point 140$^a$ at the first observation and at the point 146$^a$ at the second observation. Or the sending ship may have been at the point 140$^b$ on the first observation and the point 146$^b$ on the second observation. The difficulty of ascertaining these points is materially reduced by scribing a circle 164 having radius 160 with the point 146 as the center. The circle 164 intersects the circle 163 at the points 146$^a$ and 146$^b$, immediately giving the two possible positions of the sending ship at the second observation.

It will be understood that the dual solution indicates that the sending ship might be at either 146$^a$ or 146$^b$. The operator may then assume the position which is most likely to prove dangerous. On the other hand, he may definitely ascertain which is the true solution by cutting off the Hertzian and the main sonorous receivers, Fig. 1, and, instead, connecting alternately the selective arc receivers 44 and 45, by which he can quickly determine the approximate direction of the sending ship. Another possible assistance in respect of ascertaining the approximate direction of the sending ship, to decide between two or more possible solutions, the Hertzian sending and receiving apparatuses may be modified as in Fig. 1$^a$ and Fig. 1$^b$. These are of the type embodying the wireless direction finder or radiogoniometer referred to at pages 306–317 in the 1913 *Year Book of Wireless Telegraphy and Telephony*, published by the Marconi Press Agents, Limited, in London.

There has thus been described a method or system for determining the location of an unseen sending vessel.

The reckoning can be reduced to extreme simplicity by the following convenient instrument which is shown embodied in the same Fig. 12 with the diagram. This is a jointed quadrilateral drafting instrument consisting of a compass rose protractor disk combined with the scaled arms. A central pivot pin at 140 affords a swinging point for the scaled arm 170, the scaled arm 171 and the protractor disk 172. The latter may have not only the ordinary compass designations but the code characters A, B, C, etc., already referred to indicating the thirty-six courses beginning and ending with due north. The arm 170 is supposed to represent the course of the observer's vessel 21 at which the signals are received, and this will first be set in a convenient position on the drawing board and there fixed by a tack 173. Assuming this course is due east, the protractor disk is then rotated until the east point on the disk corresponds with the slot in the arm 170. The arm 171 will then be set upon the protractor disk to correspond with the course of the sending vessel, where it will be secured by a tack 173. An adjustable and swinging scaled arm 175 has a pivot device at 145 slidable along arm 170, and similarly the adjustable swinging scaled arm 176 has a sliding and pivoted connection at 146 with the arm 171. The arm 175 may have a horizontally projecting stop pin 177 adjustable along its scale and the arm 176 a similar, but vertical, stop pin 178 adapted to contact the pin 177. The employment of this instrument may be described by a typical instance which may correspond with the instance employed in describing the diagram. Suppose at the first observation the distance of the sending ship is indicated to be the length of the radius 160, we thereupon set the stop pin 178 at the corresponding point on the scaled arm 176 so that if the arm were swung the pin would describe the circle 164. Suppose also that, on the second observation, the distance is indicated as that of the radius 162, we thereupon adjust the stop pin 177 at the corresponding point on the scaled arm 175. It will be understood that the devices 145 and 146 respectively have previously been set and clamped upon the scaled arms 170 and 171 at positions corresponding with the distance traveled by the respective ships during the period of time between the two observations. On bringing the two stop pins into contact, as shown, the point 146ª is immediately ascertained, and, according to the diagram explanation already given, it will be seen that this simple manipulation gives the position of the sending ship at the time of the second observation. Of course, if the arms were swung to the other side, the other solution 146ᵇ would be given as indicated by the dotted positions of the arms 175 and 176. Obviously, successive pairs of readings may be similarly treated so that, after obtaining, for example, the point 146ª on the second observation, a subsequent series of points may be obtained from time to time as desired, these points indicating the actual course of the sending ship as the receiving ship advances along the line 141 in the direction of the scaled arm 170. This simple four-armed instrument of Fig. 12 is useful not only in determining the position of the unseen sending ship, as described, but is also useful in conjunction with the apparatus of Fig. 6 for quickly determining the hypothetical rate of approach of the vessels, so as to lay out the danger line 150* on the Fig. 6 diagram. Thus, immediately upon the arms 170, 171, being secured in position and the devices 145 and 146 set at corresponding points determined by the respective speeds of the ships, one of the scaled arms 175 or 176 may be swung down so as to stand along the line 143 for measuring the length of the latter so that the operator can immediately adjust the arm 150 (Fig. 6) to determine the danger line or angle.

Thus has been described a complete system or method together with full complement of means, mechanism, apparatus and instruments for accurately and promptly making the desired reckonings. Considering the entire system from the point of view of the receiving operator it may work out as follows. It will be understood that he is provided with the head piece receiving arrangement and, at one hand, with the traveling paper apparatus of Figs. 6 to 8, and at the other hand with the drafting instrument of Fig. 12. Two ships are supposed to be approaching each other in a fog. The sending ship is sending out at the designated intervals a series of symbols indicative of its course. When several miles away, the receiving operator first perceives Hertzian impulses, these affording him intelligence of the course and speed of the sending ship. Of course, the course and speed of his own ship are known. The protractor and the arm 170 in Fig. 12 are therefore already set. He swings the arm 171 to the course of the sending ship and secures it. He adjusts the devices 145 and 146 in proportion to the respective speeds of the ships. He swings down one of the arms 175, 176, reading from it the distance 143, representing the hypothetically dangerous rate of approach of the ships. Turning to the Fig. 6 apparatus he swings out the arm 150 to the corresponding point on the scale 153 and, for the time being, clamps it. He then awaits the time when both Hertzian and sonorous impulses are received. Thereupon he operates the Fig. 6 apparatus by depressing the key 130 by the Hertzian impulse and releasing it by the sound impulse, giving the first ordinate 109. Probably at this time he would set the parallel rule 155 to the extremity of the first ordinate and rule on the diagram the danger line parallel to the line 150*. This enables him to swing the parallel rule and its supporting arm back to the collapsed position shown. He may now resume operation of the key 130 so as to construct a series of ordinates 109, and may keep this up as long as there is any uncertainty. If the plotting 109* corresponds with the danger line parallel to the line 150* he will know that there is danger and the operations must be kept up for a prolonged period until different conditions are indicated. At a convenient period after the first observation, say five minutes, a second observation may be taken for the purposes of the Fig. 12 instrument. If the devices 145 and 146 do not happen to be at the correct points, they will be readjusted according to the travel of the two ships, and thereupon the pins 177 and 178 will be adjusted to the respective distance readings, and then brought into contact, giving immediately the position, or one of two possible positions, of the sending vessel. As to which of the two possible positions is the true one, will be readily determined either by the selective arc receivers indicated in Fig. 1 or the radio-goniometer in Fig. 1ᵇ. The described adjustments and determinations will be seen to be exceedingly readily made and they promptly determine the various desired conditions so that, at all times, as two vessels approach a possible point of collision, the observer is entirely on guard and is able to instruct those in charge of the navigation of the vessel so that they can avoid the dangers indicated.

It will be understood that where the observations indicate that the receiving vessel is hauling aft, it would naturally reduce speed to increase the margin of safety, but in most other instances it would be unnecessary for either vessel to change either speed or course. It will also be understood that where either vessel for some reason makes a change of course that fact would be at once communicated and the receiving ship would begin a new series of observations.

Portions of the above described improvement might be usefully employed by means of light and sound signals sent out from a light-ship or lighthouse on a clear night. Also the described system might be supplemented by the additional use of fog whistles in conjunction with the other signals when the vessels are in very close proximity.

It will thus be seen that there has been described a system of fog navigation embodying the principles and attaining the objects and advantages hereof, and other advantages will be apparent to those skilled in the art. Since many matters of design, combination, detail and other features may be variously modified without departing from the principles hereof, no limitation to such features is intended except as specified in the appended claims.

What is claimed is:

1. The improvement in the art of navigation which consists in transmitting between two vessels data giving the course and speed of one of said vessels, making successive distance observations on board the other of said vessels, plotting therefrom the rate of approach of said vessels, and comparing the same with a graphically delineated hypothetical rate of approach determined from the respective speeds and courses of both vessels on the assumption of their collision, thereby showing the possibility of collision by indicating whether the observed vessel is preserving her relative bearing.

2. The improvement in the art of fog navigation which consists in ascertaining on board the observer's vessel the course and speed of an observed vessel by signals from the latter, determining a hypothetical rate of relative approach of the two vessels from the respective speeds and courses of both on the assumption of their collision, making successive distance observations on the observer's vessel from impulses from the observed vessel, determining therefrom the actual rate of relative approach, and comparing such actual and hypothetical rates of approach, thereby indicating whether the two vessels are preserving their relative bearing and would, under existing conditions, reach the course-intersection at the same time.

3. The improvement in the art of fog navigation which consists in ascertaining on board the observer's vessel the course and speed of an observed vessel by signals from the latter, graphically delineating a hypothetical rate of relative approach of the two vessels from the respective speeds and courses of both on the assumption of their collision, making successive distance observations on the observer's vessel from impulses from the observed vessel, plotting graphically therefrom the actual rate of relative approach, and comparing the graphical indications of such actual and hypothetical rates of approach, thereby indicating whether the two vessels are preserving their relative bearing and would, under existing conditions, reach the course-intersection at the same time.

In testimony whereof I affix my signature in presence of two witnesses.

FREDERICK LEWIS SAWYER.

Witnesses:
LESTER C. TAYLOR,
DONALD CAMPBELL.